(12) United States Patent
Morita et al.

(10) Patent No.: US 6,472,464 B1
(45) Date of Patent: *Oct. 29, 2002

(54) STYRENE-BUTADIENE COPOLYMER AND RUBBER COMPOSITION COMPRISING THE COPOLYMER

(75) Inventors: Koichi Morita, Tokyo (JP); Hajime Kondo, Tokyo (JP); Yoichi Ozawa, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,372

(22) Filed: Mar. 27, 1997

(30) Foreign Application Priority Data

Mar. 29, 1996 (JP) .............................................. 8-077228

(51) Int. Cl.⁷ .......................... C08F 293/00; C08K 3/36; C08L 53/02; C08L 25/10
(52) U.S. Cl. .......................... 524/505; 525/99; 525/313; 525/332.9
(58) Field of Search .......................... 525/99, 268, 298, 525/314, 329.1, 331.9, 313, 332.9; 524/495, 505

(56) References Cited

U.S. PATENT DOCUMENTS

| | | | | |
|---|---|---|---|---|
| 4,550,135 A | * | 10/1985 | Iwama et al. ................ | 524/495 |
| 4,575,534 A | * | 3/1986 | Oshima et al. ................ | 525/99 |
| 4,908,401 A | * | 3/1990 | Ohara et al. ................ | 524/495 |
| 5,194,485 A | * | 3/1993 | Kikuchi et al. ................ | 524/495 |
| 5,262,213 A | * | 11/1993 | Rodgers et al. ................ | 525/99 |
| 5,393,721 A | | 2/1995 | Kitamura et al. ........... | 502/154 |

FOREIGN PATENT DOCUMENTS

| | | | |
|---|---|---|---|
| FR | 2 679 914 A | | 2/1993 |
| JP | 58-162260 | * | 9/1983 |

OTHER PUBLICATIONS

Patent Abstract of Japan, vol. 016, No. 025 (Abstract of JP 03-239737, Oct. 1991).
Derwent Publications Ltd. AN 85–070529 (Abstract of JP 60 023409, Feb. 1985).

* cited by examiner

Primary Examiner—Robert E. L. Sellers
(74) Attorney, Agent, or Firm—Sughrue Mion, PLLC

(57) ABSTRACT

A styrene-butadiene copolymer having excellent low hysteresis loss characteristic, wet skid resistance, fracture characteristics, and abrasion resistance and a rubber composition comprising the copolymer are disclosed. The styrene-butadiene copolymer has a total styrene content in the range of 33 to 42% by weight of the styrene-butadiene copolymer; a content of styrene sequences having 4 to 20 styrene units in the range of 40 to 65% by weight of the total styrene content, as obtained by measurements by NMR and GPC; a content of styrene sequences having more than 20 styrene units in the range of 5% by weight or less of the total styrene content, as obtained by measurement by GPC; a content of vinyl unit in the range of 30% by mol or less of a butadiene part of the styrene-butadiene copolymer; a sum of the total styrene value and ½ of the content of vinyl units in the range of 46 to 52%; and an inner or end structure having, for example tin-carbon bond. The copolymer and the rubber composition are used for tire treads and the like.

15 Claims, 2 Drawing Sheets

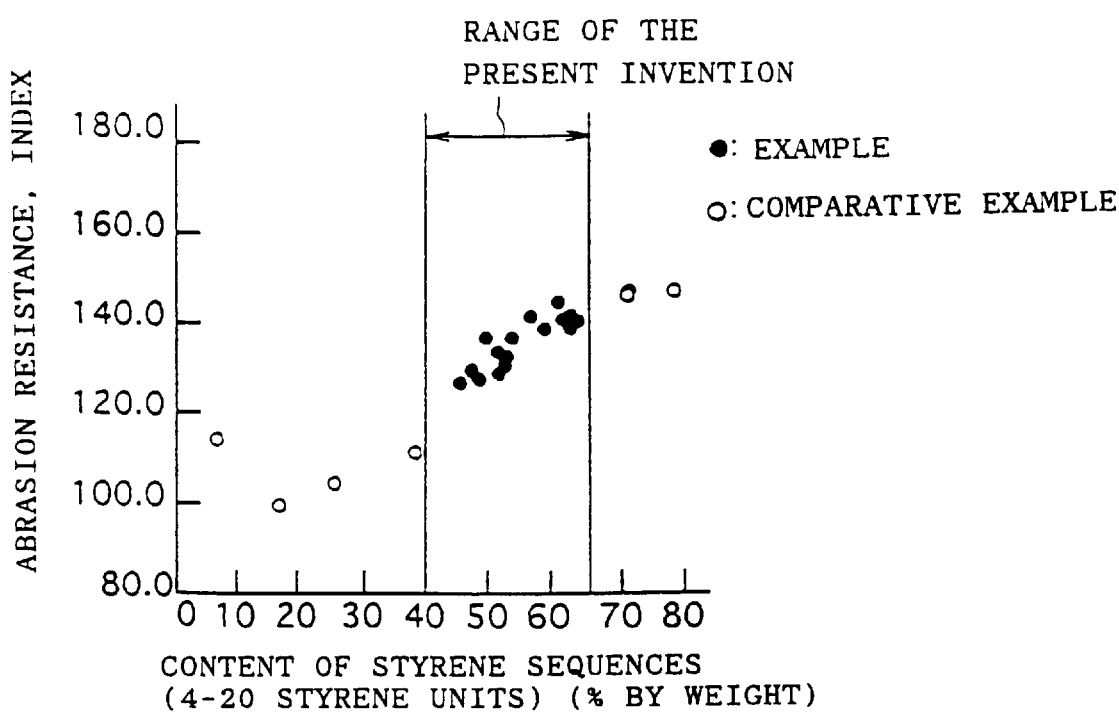

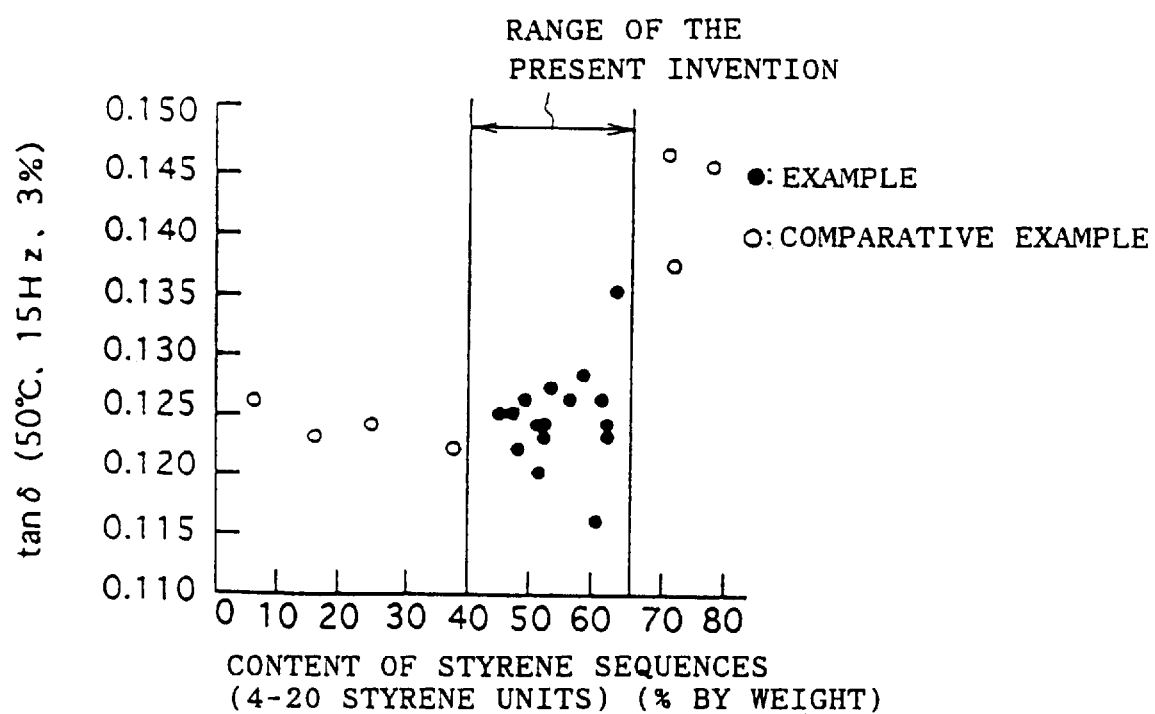

STYRENE-BUTADIENE COPOLYMER AND RUBBER COMPOSITION COMPRISING THE COPOLYMER

BACKGROUND OF THE INVENTION

1. Field of the Invention

The present invention relates to a styrene-butadiene copolymer and a rubber composition comprising the copolymer. More particularly, the present invention relates to a styrene-butadiene copolymer which has low hysteresis loss characteristic and excellent wet skid resistance, and which is very excellent in fracture characteristics and abrasion resistance, and is advantageously used for tire tread rubbers, and a rubber composition comprising the copolymer.

2. Description of Related Art

For automobiles, low fuel consumption and safety are both required. Therefore, improvement in low hysteresis loss characteristic (low rolling resistance), wet skid resistance, fracture characteristics, and abrasion resistance are strongly required for styrene-butadiene copolymers used for the tread part of tires and for rubber compositions comprising the copolymers.

Various attempts have been made to satisfy the requirements for tire tread rubbers. As one of such attempts, styrene-butadiene copolymers comprising blocks of styrene sequences have been examined. Among these styrene-butadiene copolymers, styrene-butadiene copolymers comprising blocks of styrene sequences of 4 to 20 styrene units (hereinafter referred to as short styrene blocks) have been noted in view of improvement in the abrasion resistance.

In Japanese Patent Application Laid-Open No. Showa 57(1982)-179212, a styrene-butadiene copolymer which comprises 5% by weight or less of long styrene blocks and 50% by weight or more of the isolated single styrene unit based on the total styrene content in the copolymer and 10 to 30% by weight of the total styrene based on the copolymer and shows a high abrasion resistance is described. However, this copolymer does not show sufficient fracture characteristics, abrasion resistance, and low hysteresis loss characteristic.

In Japanese Patent Application Laid-Open No. Showa 60(1985)-23409, a styrene-butadiene copolymer is obtained by a multi-step polymerization process in which the monomers are divided into portions and added successively. The obtained copolymer which comprised less than 50% by weight of styrene sequences having 1 to 3 styrene units, 30% by weight or more of styrene sequences having 4 to 20 styrene units, and 20% by weight or less of styrene sequences having more than 20 styrene units all based on the total styrene content in the copolymer, and 10 to 45% by weight of the total styrene based on the copolymer, and which had tin-carbon bond exhibited a high strength at break, a high abrasion resistance, and a low hysteresis loss.

However, controlling the content of the short styrene block is difficult in this process, and long styrene blocks which are inferior in the low hysteresis loss characteristic tend to be formed. The content of short styrene blocks is measured by the ozonolysis-gel permeation chromatography (GPC) method in the above patent application. This method provides a different value from the method in the present invention which uses the nuclear magnetic resonance spectroscopy (NMR) and GPC in combination. For example, a styrene-butadiene copolymer obtained in an example of the above patent application had a content of short styrene blocks of 48% by weight. However, when the measurement is made on this copolymer by the method using NMR and GPC in combination, the copolymer contains 78% by weight of short styrene blocks. (This is described below with reference to data.) Therefore, a greater amount of long styrene blocks are formed in accordance with the process described in the above patent application to cause inferior low hysteresis loss characteristic.

In Japanese Patent Application Laid-Open Heisei 1(1989)-230647, a styrene-butadiene copolymer was obtained by using an organolithium initiator, a potassium compound, and a tin compound. The obtained copolymer comprises 40% by weight or less of the isolated single styrene unit, 60% by weight or more of styrene sequences having 2 to 7 styrene units, and 10% by weight or less of styrene sequences having 8 or more styrene units all based on the total styrene content, and 5 to 50% by weight of the total styrene based on the copolymer, and showed a high strength at break, a high abrasion resistance, and a high resilience. However, this copolymer was insufficient in the wet skid resistance and the low hysteresis loss characteristic.

It is generally known that, for incorporating short styrene blocks into a styrene-butadiene copolymer, styrene and butadiene are copolymerized by using an organolithium initiator and a potassium compound. However, controlling the amount of short styrene blocks is difficult in this process. In order to satisfy the requirement for the low hysteresis loss characteristic, it is necessary that the distribution of styrene in the main chain be made uniform. This requirement can be satisfied by using a suitable amount of a potassium compound. However, the amount of short styrene blocks is increased, for example, to 70% or more under such a condition, and the requirement for the low hysteresis loss characteristic cannot be satisfied.

On the other hand, as the process for producing a styrene-butadiene copolymer containing short styrene blocks, the process described in the U.S. Pat. No. 5,393,721 has been known. This patent discloses that styrene and butadiene are copolymerized by using a soluble initiator comprising a mixture of an organolithium compound having a cyclic amine group, an organopotassium compound, and a chelating agent such as an ether, and the resultant copolymer is treated for coupling with a tin compound to obtain a styrene-butadiene copolymer excellent in the fracture characteristics, the abrasion resistance, and the low hysteresis loss characteristic. However, when a high temperature is used for increasing the productivity in this process, the lithium at the end tends to be deactivated, and efficiency of the coupling is decreased. Thus, the low hysteresis loss characteristic of this copolymer becomes insufficient. This copolymer has another drawback in that the copolymer is inferior in the processability because amine is bonded at the end of the copolymer molecule. Thus, this copolymer sometimes is not advantageous in practical application.

SUMMARY OF THE INVENTION

The present invention has been made under the above circumstances and has objects of providing a styrene-butadiene copolymer which is excellent in the processability, has the low hysteresis loss characteristic and the wet skid resistance held at high levels, shows remarkably improved fracture characteristics and abrasion resistance, and used for tire treads, and also providing a rubber composition comprising the copolymer.

The present inventors paid attention to the molecular structure of the styrene-butadiene copolymer, particularly to the sequences of styrene units, in order to satisfy the above requirements, and conducted extensive studies. As the result, it was discovered that the above requirements can simultaneously be satisfied by the following copolymer and composition, and the present invention was completed on the basis of the discovery.

Accordingly, the present invention provides a styrene-butadiene copolymer wherein:

a total styrene content is in the range of 33 to 42% by weight of the styrene-butadiene copolymer;

a content of styrene sequences having 4 to 20 styrene units is in the range of 40 to 65% by weight of the total styrene content, as measured by nuclear magnetic resonance spectroscopy and gel permeation chromatography in combination;

a content of styrene sequences having more than 20 styrene units is in the range of 5% by weight or less of the total styrene content, as measured by gel permeation chromatography;

a content of vinyl unit is in the range of 30% by mol or less of the butadiene part of the styrene-butadiene copolymer;

a sum of the total styrene value and ½ of the content of vinyl units is in the range of 46 to 52%; and an inner or end structure ha s a bond selected from the group consisting of tin-carbon bond, carbon-carbon bond, carbon-nitrogen bond, and carbon oxygen bond.

BRIEF DESCRIPTION OF THE DRAWINGS

FIG. 1 shows a chart exhibiting the relation between the content of styrene sequences having 4 to 20 styrene units in a copolymer and the abrasion resistance of the copolymer.

FIG. 2 shows a chart exhibiting the relation between the content of styrene sequences having 4 to 20 styrene units in a copolymer and the hysteresis loss (tan δ) of the copolymer.

DETAILED DESCRIPTION OF THE INVENTION

The total styrene content in the styrene-butadiene copolymer of the present invention is in the range of 33 to 42% by weight. When the content is more than 42% by weight, the low hysteresis loss characteristic (tan δ at 50° C.) is inferior although the wet skid resistance is good. When the content is less than 33% by weight, it becomes difficult that the content of styrene sequences having 4 to 20 styrene units is made 40% by weight or more of the total styrene. In order to make the content of these sequences 40% by weight or more of the total styrene under the condition that the total styrene content is less than 33% by weight, the styrene units must be distributed unevenly in the styrene-butadiene copolymer, and this causes increase in the hysteresis loss. As is well known, in order to realize a high level of the wet skid resistance using a copolymer containing a decreased amount of styrene, the vinyl unit content in the butadiene part must be increased to compensate the decrease in the styrene content, and this causes decrease in the abrasion resistance.

In the styrene-butadiene copolymer of the present invention, the content of styrene sequences having 4 to 20 styrene units is in the range of 40 to 65% by weight based on the total styrene content, as measured by the method using NMR and GPC in combination (described below). When the content is less than 40% by weight, the fracture characteristics and the abrasion resistance are inferior although the low hysteresis loss characteristic is good. When the content is more than 65% by weight, the low hysteresis loss characteristic is inferior although the fracture characteristics and the abrasion resistance are good.

The content of styrene sequences having more than 20 styrene units is in the range of 5% by weight or less based on the total styrene content, as measured by the ozonolysis-GPC method (described below). When the content is more than 5% by weight, the hysteresis loss is increased, and such a content is not preferable.

The content of styrene sequences having 1 to 3 styrene units is obtained by subtracting the content of styrene sequences having 4 to 20 styrene units and the content of styrene sequences having more than 20 styrene units from the total styrene content.

The content of the vinyl unit in the butadiene part of the styrene-butadiene copolymer of the present invention is in the range of 30% by mol or less. When the content is more than 30% by mol, the abrasion resistance is decreased.

The sum of the total styrene value and ½ of the content of vinyl units is in the range of 46 to 52%. The sum must be kept in this range for simultaneously exhibiting the excellent wet skid resistance and the excellent low hysteresis loss characteristic. When the sum is less than 46%, the wet skid resistance is inferior although the low hysteresis loss characteristic is good. When the sum is more than 52%, the low hysteresis loss characteristic is inferior.

The inner or end structures of the styrene-butadiene copolymer of the present invention have a bond selected from tin-carbon bond, carbon-carbon bond, carbon-nitrogen bond, and carbon-oxygen bond. The inner structure of the copolymer means a structure which connects, for example, 2 to 4 chains of the copolymer to each other through a tin atom. In other words, when the inner structure is present, a structure such as tin-carbon bond is present at an inner part of the finally obtained copolymer molecule. The end structure of the copolymer means a specific structure at an end part in one copolymer molecule (one molecule of a finally obtained copolymer). These bonds are formed by a coupling reaction or a modification reaction between the carbanion at the end part of the styrene-butadiene copolymer obtained by the copolymerization and a tin compound, an isocyanate compound, an imidazolidinone compound, or an aminobenzophenone compound, as described below.

Other examples of the above structure include carbon-phosphorous bond, carbon-sulfur bond, and carbon-silicon bond.

Among the above structures, the tin-carbon bond is preferable. The above structures are essential in the copolymer of the present invention because these structures have the function of improving the low hysteresis loss characteristic and the abrasion resistance by the interaction of these structures with a filler such as carbon black.

The weight-average molecular weight of the styrene-butadiene copolymer of the present invention (the copolymer before a coupling reaction or a modification reaction) is preferably $5\times10^4$ to $100\times10^4$ and more preferably $10\times10^4$ to $100\times10^4$ in order to obtain the excellent physical properties. The molecular weight distribution (Mw/Mn) of the copolymer before a coupling reaction or a modification reaction is preferably 1.0 to 1.3.

As the process for producing the styrene-butadiene copolymer of the present invention, any process can be used without particular restriction as long as the molecular structure specified in the present invention can be obtained. The copolymer of the present invention can easily be obtained in accordance with the following process.

In a hydrocarbon solvent, styrene and butadiene are copolymerized in the presence of (1) an organolithium initiator, (2) at least one type of potassium compound selected from the group consisting of potassium alcoholates, potassium sulfonates, and potassium carboxylates, and (3) at least one compound selected from the group consisting of ether compounds and amine compounds. After copolymerization has been completed, a compound selected from the group consisting of tin compounds, isocyanate compounds, imidazolidinone compounds, and aminobenzophenone compounds is added to the obtained copolymer as the coupling agent or the modifier to obtain the styrene-butadiene copolymer of the present invention.

A Examples of the hydrocarbon solvent used in the present invention include aromatic hydrocarbon solvents, such as benzene, toluene, and xylene; aliphatic hydrocarbon solvents, such as n-pentane, n-hexane, and n-butane; alicyclic hydrocarbon solvents, such as methylcyclopentane and cyclohexane; and mixture of these solvents. The hydrocarbon solvent is not particularly limited.

Examples of the organolithium initiator used in the present invention include alkyllithiums and alkyldilithiums, such as methyllithium, ethyllithium, propyllithium, n-butyllithium, sec-butyllithium, t-butyllithium, hexyllithium, octyllithium, tetramethylenedilithium, pentamethylenedilithium, and hexamethylenedilithium; aryllithiums and aryldilithiums, such as phenyllithium, tolyllithium, and lithium naphthylide; and aralkyllithiums and aralkyldilithiums, such as benzyllithium and dilithium formed by the reaction of diisopropenylbenzene and butyllithium. Among these organolithium initiators, n-butyllithium and sec-butyllithium are preferable in view of the industrial applicability. A single type or a mixture of two or more types of the organolithium initiator can be used. The amount of the organolithium initiator used in the polymerization is decided depending on the desired molecular weight of the obtained copolymer. The amount is generally 0.05 to 15 mmol, preferably 0.1 to 10 mmol, per 100 g of the monomer. When the amount is more than 15 mmol, obtaining a high molecular weight polymer is difficult. When the amount is less than 0.05 mmol, the polymerization does not proceed occasionally. Thus, such an amount is not preferable.

The potassium compound, the ether compound, and the amine compound used in the present invention have the function of the so-called randomizer. The randomizer means a compound having the function of increasing the content of the vinyl unit in the butadiene part and randomizing the distribution of the styrene unit and the butadiene unit in the styrene-butadiene copolymer. The potassium compound has a rather small effect to increase the content of the vinyl unit.

The potassium compound used in the present invention is a potassium alcoholate, a potassium sulfonate, and/or a potassium carboxylate. Examples of the potassium alcoholate include potassium t-butylate, potassium t-amylate, potassium ethylate, potassium isopropylate, potassium cctate, potassium dodecanoate, and potassium nonylphenolate. Among these compounds, potassium t-amylate and potassium nonylphenolate are preferable in view of the effects of the present invention.

Examples of the potassium sulfonate include potassium dodecylbenzenesulfonate and potassium naphthalenesulfonate. Among these compounds, potassium dodecylbenzenesulfonate is preferable in view of the effect.

Examples of the potassium carboxylate include potassium stearate, potassium decanoate, and potassium naphthoate. Particularly, potassium naphthoate is preferable in view of the effect.

The amount of the potassium compound used in the copolymerization is 0.01 to 0.2 mol equivalent, preferably 0.03 to 0.09 mol equivalent per 1 mol of lithium. When the amount is less than 0.01 mol equivalent, the effect as the randomizer sometimes is not exhibited. When the amount is more than 0.2 mol equivalent, undesirable side reactions such as metallation occur sometimes. Thus, such an amount is not preferable.

In the present invention, an ether compound and/or an amine compound is used in combination with the potassium compound. As the ether compound and the amine compound, compounds generally used as the randomizer in the copolymerization of styrene and butadiene can be used and are not particularly limited. Particularly, dialkoxyalkyl compounds, such as diethoxyethane; diethylene glycol dialkyl ether compounds, such as diethylene glycol dimethyl ether and diethylene glycol diethyl ether; ethylene glycol dialkyl ether compounds, such as ethylene glycol dimethyl ether and ethylene glycol diethyl ether; tetrahydrofuran oligomer compounds, such as ditetrahydrofurylpropane; tetrahydrofuran; diamine compounds, such as tetramethylethylenediamine; and triamine compounds, such as pentamethylenediethylenetriamine, are advantageously used.

The ether compound or the amine compound is used in the copolymerization preferably in such an amount that the content of the vinyl unit in the obtained copolymer in the butadiene part is 30% by mol or less. The amount of the ether compound or the amine compound is different depending on the type of the ether compound or the amine compound and cannot be specified. An amount of 0.01 to 2.0 mol equivalent per 1 mol of lithium is generally used. For example, when tetrahydrofuran is used, an amount of 0.5 to 2.0 mol equivalent is preferable. When diethylene glycol dimethyl ether is used, an amount of 0.03 to 0.1 mol equivalent is preferable.

The coupling agent or the modifier used in the present invention is a compound selected from the group consisting of tin compounds, isocyanate compounds, imidazolidinone compounds, and aminobenzophenone compounds.

Examples of the tin compound include tin halides, such as tin tetrachloride; and organotin chlorides, such as butyltin trichloride, dibutyltin dichloride, dioctyltin dichloride, diphenyltin dichloride, tributyltin chloride, and triphenyltin chloride. The tin compound can be used in the copolymerization in such an amount that the amount of the halogen atom in the above compound is equivalent to the amount of the lithium at the active end of the styrene-butadiene copolymer.

Examples of the isocyanate compound include phenyl isocyanate, 2,4-tolylene diisocyanate, 2,6-tolylene diisocyanate, diphenylmethane diisocyanate, and naphthalene diisocyanate.

Examples of the imidazolidinone compound include dimethylimidazolidinone and diethylimidazolidinone.

Examples of the aminobenzophenone compound include p-N,N'-dimethylaminobenzophenone and p-N,N'-diethylaminobenzophenone.

Compounds other than those described above, such as aminobenzaldehyde compounds and carbodiimide compounds, can also be used.

Among these compounds, tin tetrachloride, organotin chlorides, dimethylimidozolidinone, and p-N,N'-dimethylaminobenzophenone are preferable in view of the effect.

Among these compounds, for example, tin tetrachloride and organotin dichlorides carry out the coupling reaction with the carbanion end of the styrene-butadiene copolymer to form coupled copolymers. The efficiency of the coupling reaches 60% or more, and the coupling contributes to improvement in the low hysteresis loss characteristic. As other examples, organotin monochlorides, imidazolidinone compounds and aminobenzophenone compounds carry out the modification reaction with the carbanion end of a copolymer to form copolymers modified at the end, and the modification contributes to improvement in the low hysteresis loss characteristic.

The rubber composition of the present invention comprises (1) 100 parts by weight of a rubber component comprising 20 parts by weight or more of the styrene-butadiene copolymer of the present invention; (2) 25 to 150 parts by weight of a filler selected from the group consisting of carbon black, silica, and a combination of carbon black and silica; and (3) 0 to 50 parts by weight of a process oil.

In the rubber component, a diene rubber can be used by blending with the styrene-butadiene copolymer of the present invention. Examples of the diene rubber include natural rubber (NR), butadiene rubber (BR), isoprene rubber (IR), conventional styrene-butadiene rubber (SBR) different from that in the present invention, and blends of these rubbers. It is necessary that the copolymer of the present invention be comprised in the rubber component in an amount of 20 parts by weight or more, preferably 30 parts by weight or more per 100 parts by weight of the rubber component.

As the filler used in the present invention, carbon black alone, silica alone, or a combination of carbon black and silica can be used. The amount used in the rubber composition is 25 to 150 parts by weight, preferably 35 to 100 parts by weight per 100 parts by weight of the rubber component.

When silica alone or a combination of carbon black and silica is used as the filler in the rubber composition of the present invention, a silane coupling agent may also be comprised in an amount of 3 to 20% by weight based on the weight of the silica. When the amount of the silane coupling agent is less than 3% by weight, the effect of the silane coupling agent is not exhibited. When the amount of the silane coupling agent is more than 20% by weight, the effect is not exhibited to the degree expected from the used amount while the cost is increased. Thus, such an amount is not preferable.

Examples of the silane coupling agent include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazol tetrasulfide, 3-triethoxysilylpropylbenzothiazol tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, and dimethoxymethylsilylpropylbenzothiazol tetrasulfide. Among these compounds, bis(3-triethoxysilylpropyl) tetrasulfide and 3-trimethoxysilylpropylbenzothiazol tetrasulfide are preferable.

Example of the process oil used in the present invention include paraffinic process oils, naphthenic process oils, and aromatic process oils. The amount of the process oil used in the present invention is in the range of 0 to 50 parts by weight per 100 parts by weight of the rubber component. When the amount is more than 50 parts by weight, the fracture characteristics and the low hysteresis loss characteristic are inferior.

In the rubber composition of the present invention, compounding ingredients generally used in the rubber industry, such as other reinforcing fillers, vulcanizing agents, stearic acid, zinc oxide, vulcanization accelerators, and antioxidants, can suitably be used.

EXAMPLES

The present invention is described in more detail with reference to examples in the following. However, the present invention is not limited by the examples.

Various measurements were conducted in accordance with the following methods.

The molecular weight and the molecular weight distribution (Mw/Mn) of a copolymer were measured by using a GPC apparatus (a product of TOSO Co., Ltd., HLC-8020; column: a product of TOSO Co., Ltd., GMH-XL (two columns in series); solvent, tetrahydrofuran (THF), 1 ml/min). The average molecular weights (Mn and Mw) were obtained by using polystyrene as the reference. The values were obtained with polymers before the coupling.

The microstructure of the butadiene part (the content of the vinyl unit in %) was obtained by the infrared spectroscopy (D. Morero et al., Chem. Ind., 41, 758 (1959)). The total styrene content was obtained from the intensity of the aromatic protons in the nuclear magnetic resonance spectrum (NMR). From these results, the value of (styrene+½ vinyl units) was obtained.

The contents of styrene sequences were obtained as follows.

(a) By using a solution prepared by dissolving 20 mg of a sample in 1 ml of $CDCl_3$, the measurement of a 400 MHz NMR was repeated 120 times and accumulated. In the obtained chart of the accumulated measurements, the part of 7.95 to 6.00 ppm was assigned to the total styrene, and the part of 6.94 to 6.00 was assigned to styrene sequences having 4 or more styrene units. The amounts of the total styrene and styrene sequences having 4 or more styrene units were obtained from the respective assigned parts.

(b) A sample of the copolymer was analyzed by the ozonolysis-gel permeation chromatography (GPC) method (Tanaka et al., Polymer, Vol. 22, 1981, Pages 1721 to 1723). The amount of styrene sequences having 20 or more styrene units was obtained as the amount of the component having a molecular weight of 2500 or more in the decomposition product.

apparatus: a product of TOSO Co., Ltd.; HLC8020
    column: a product of TOSO Co., Ltd.; GMH-XL-L (two columns in series)

(c) The amount of styrene sequences having 4 to 20 styrene units was obtained by subtracting the amount of the styrene sequences having 20 or more styrene units obtained in (b) from the amount of styrene sequences having 4 or more styrene units obtained in (a).

From the amounts obtained above, the content of each group of styrene sequences was obtained in terms of % by weight based on the total styrene content.

The efficiency (%) of the tin coupling was obtained from the elution curve of GPC of a tin-coupled block copolymer. The efficiency was obtained from the fraction by area of the part of the higher molecular weight in the bimodal shape of the elution curve.

The Mooney viscosity was measured by using ROTORLESS MOONEY VISCOMETER RLM-01 type, a product of TOYO SEIKI, at 128° C.

The tensile strength, the elongation, and the modulus at 300% were measured in accordance with the method of Japanese Industrial Standard K6301 at a room temperature.

The hardness was measured in accordance with the method of Japanese Industrial Standard K6301 by using a spring type A hardness meter. The abrasion resistance was obtained by using a Lambourn abrasion tester of the British standard type as follows: the amount of abrasion at a room temperature was measured at the slip ratio of 60%; then the abrasion resistance was represented by the reciprocal of the obtained value and expressed in terms of an index based on a control which was set as 100. Therefore, a larger value shows a better abrasion resistance. The control was selected as follows: the value obtained in Comparative Example 1 for the values obtained in Examples 1 to 22 and Comparative Examples 2 to 8, the value obtained in Comparative Example 9 for the values obtained in Examples 23 and 24 and Comparative Examples 10 to 12, the value obtained in Comparative Example 13 for the value obtained in Example 25, the value obtained in Comparative Example 14 for the value obtained in Example 26, and the value obtained in Comparative Example 15 for the value obtained in Example 27.

The hysteresis loss characteristic, tan δ, was measured by using a viscoelastometer of the RVE type which was a product of RHEOMETRICS Corp. at 50° C. under the strain of 3% and at the frequency of 15 Hz. The obtained tan δ shows the hysteresis loss characteristic relative to a control. A smaller value of tan δ shows a better hysteresis loss characteristic. The control was selected as follows: the value obtained in Comparative Example 1 for the values obtained Examples 1 to 22 and Comparative Examples 2 to 8, the value obtained in Comparative Example 9 for the values obtained in Examples 23 and 24 and Comparative Examples 10 to 12, the value obtained in Comparative Example 13 for the value obtained in Example 25, the value obtained in Comparative Example 14 for the value obtained in Example 26, and the value obtained in Comparative Example 15 for the value obtained in Example 27.

The wet skid resistance was measured by using a portable skid tester in accordance with the British Standard (a product of STANLEY LONDON Company), and the obtained value was expressed in terms of an index. A larger index value shows a better wet skid resistance. The control was selected in the same manner as that in the measurement of the abrasion resistance.

Example 1

After a 800 ml pressure resistant glass bottle was sufficiently purged with nitrogen, 207 g (31.1 g of butadiene) of a 15.1% cyclohexane solution of 1,3-butadiene and 80 g (18.8 g of styrene) of a 23.4% cyclohexane solution of styrene were placed into the bottle under nitrogen. To the obtained solution, 0.43 ml (0.022 mmol, K/Li=0.05 eq) of a 0.05 N (oxygen normality) cyclohexane solution of potassium t-amylate as the potassium compound and 0.86 ml (0.042 mmol, ether compound/Li=0.1 eq) of a 0.05 N cyclohexane solution of diethoxyethane as the ether compound were added. To the thus obtained monomer mixture, 0.266 ml (0.425 mmol) (0.85 mmol/100 g monomer) of a 1.6 N n-hexane solution of n-butyllithium (n-BuLi) was added as the initiator. The obtained mixture was allowed to polymerize in a rotary polymerization bath at 50° C. for 2 hours. A sample of the resultant reaction solution was taken, and the molecular structures (the total styrene content, the contents of styrene sequences, the content of the vinyl unit in the butadiene part, the value of styrene+½ of the content of the vinyl units, the molecular weight, and the molecular weight distribution) of the obtained copolymer was measured. The results are shown in Table 1. Then, 0.26 ml of a 1 N cyclohexane solution of tin tetrachloride was added to the reaction solution, and the coupling reaction was allowed to proceed at 50° C. for 30 minutes. After the coupling reaction has been completed, 0.1 g of BHT (2,6-di-t-butyl-p-cresol) was added to the reaction solution as the antioxidant, and the reaction solution was dried by a conventional method to obtain copolymer E-1. The efficiency of the tin coupling in this copolymer was measured. The result is shown in Table 1.

By using the obtained copolymer, a rubber composition was prepared in accordance with the formulation shown in Table 8 by kneading the components using a 250 ml LABO PLASTOMILL (a product of TOYO SEIKI CO. LTD.) and a 3 inch roll. The obtained rubber composition was vulcanized at 145° C. for 30 minutes, and the physical properties of the obtained vulcanizate were measured. The results are shown in Table 1.

Examples 2 to 12

The same procedures as those conducted in Example 1 were conducted except that a potassium compound of the type and the amount shown in Table 1 or 2 and an ether compound or an amine compound of the type and the amount also shown in Table 1 or 2 was used, and copolymers E-2 to E-12 were obtained. The molecular structure of the obtained copolymers and the physical properties of vulcanizates obtained by using the copolymers were measured by the same methods as those used in Example 1. The results are shown in Tables 1 and 2.

Examples 13 to 16

The same procedures as those conducted in Example 1 were conducted except that styrene monomer was used in the amount shown in Table 3, and an ether compound of the type and the amount also shown in Tables 3 was used, and copolymers E-13 to E-16 were obtained. The molecular structure of the obtained copolymers and the physical properties of vulcanizates obtained by using the copolymers were measured by the same methods as those used in Example 1. The results are shown in Table 3.

Examples 17 to 22 and Comparative Example 8

After a 10 liter reactor was sufficiently purged with nitrogen, 4139 g (625 g of butadiene) of a 15.1% cyclohexane solution of 1,3-butadiene and 1603 g (375 g of styrene) of a 23.4% cyclohexane solution of styrene were placed into the reactor under nitrogen. To the obtained solution, 7.68 ml (0.375 mmol, K/Li=0.05 eq) of a 0.05 N cyclohexane solution of potassium t-amylate as the potassium compound and 1.0 ml (0.502 mmol, ether compound/Li=0.067 eq) of a 0.5 N (oxygen normality) cyclohexane solution of diethylene glycol dimethyl ether as the ether compound were added. To the thus obtained monomer mixture, 4.69 ml (7.5 mmol) (0.75 mmol/100 g monomer) of a 1.6 N n-hexane solution of n-BuLi was added as the initiator. The obtained mixture was allowed to polymerize for 1.5 hours while the temperature was increased from 30° C. to 70° C. A sample of the resultant reaction solution was taken, and the molecular structure of the obtained copolymer was measured. The results are shown in Table 5.

Portions of the obtained solution of the living polymer each in an amount of 287 g were taken and placed each into a 800 ml pressure-resistant glass bottle to prepare 7 bottles containing the solution. Into six of the thus prepared bottles, a coupling agent or a modifier shown in Table 5 was added in an amount of 0.6 equivalent per lithium, and the coupling reaction or the modification reaction was allowed to take place at 50° C. for 30 minutes. After the reaction has been completed, 0.1 g of BHT was added to the reaction solution as the antioxidant, and the reaction solution was dried by a conventional method to obtain copolymers E-17 to E-22. To the remaining bottle prepared above, isopropyl alcohol was added to terminate the living condition, and copolymer C-8 (Comparative Example 8) which was not modified at the end was obtained. The efficiencies of the coupling in the obtained copolymers and the physical properties of vulcanizates obtained by using the copolymers were measured by the same methods as those used in Example 1. The results are shown in Table 5.

Examples 23 and 24

The same procedures as those conducted in Example 1 were conducted except that copolymer E-17 obtained in Example 17 was used, the ratio of blending of NR and SBR was changed as shown in Table 6, and rubber compositions were prepared in accordance with the formulation shown in Table 9. The physical properties of vulcanizates obtained from the prepared rubber compositions were measured also by the same methods as those used in Example 1. The results are shown in Table 6.

Example 25

The same procedures as those conducted in Example 1 were conducted except that copolymer E-17 obtained in Example 17 was used, NR and SBR were blended in a ratio shown in Table 7, carbon black and silica were used in the amounts shown in Table 7, and a rubber composition was prepared in accordance with the formulation shown in Table 10. The physical properties of a vulcanizate obtained from the prepared rubber composition were measured also by the same methods as those used in Example 1. The results are shown in Table 7.

Example 26

The same procedures as those conducted in Example 1 were conducted except that copolymer E-17 obtained in Example 17 was used, NR and SBR were blended in a ratio shown in Table 7, silica was used in the amount shown in Table 7, and a rubber composition was prepared in accordance with the formulations shown in Table 11. The physical properties of a vulcanizate obtained from the prepared rubber composition were measured also by the same methods as those used in Example 1. The results are shown in Table 7.

Example 27

After a 5 liter reactor was sufficiently purged with nitrogen, 2070 g (313 g of butadiene) of a 15.1% cyclohexane solution of 1,3-butadiene and 802 g (188 g of styrene) of a 23.4% cyclohexane solution of styrene were placed into the reactor under nitrogen. To the obtained solution, 3.84 ml (0.192 mmol, K/Li=0.05 eq) of a 0.05 N cyclohexane solution of potassium t-amylate as the potassium compound and 0.5 ml (0.251 mmol, ether compound/Li=0.067 eq) of a 0.5 N (oxygen normality) cyclohexane solution of diethylene glycol dimethyl ether as the ether compound were added, and the temperature of the obtained mixture was adjusted to 40° C. To the thus obtained monomer mixture, 2.34 ml (3.744 mmol) (0.75 mmol/100 g monomer) of a 1.6 N n-hexane solution of n-BuLi was added as the initiator. Then, the temperature of the resultant reaction mixture was increased to allow the polymerization to proceed. The temperature reached the maximum of 90° C. after 40 minutes. A sample of the resultant reaction solution was taken, and the molecular structure of the obtained copolymer was measured. The results are shown in Table 7. After the temperature reached 90° C., 2.62 ml of a 1 N cyclohexane solution of tin tetrachloride was added to the reaction solution as the coupling agent, and the coupling reaction was allowed to proceed for 15 minutes. After the coupling reaction has been completed, 0.1 g of BHT (2,6-di-t-butyl-p-cresol) was added to the reaction solution as the antioxidant, and the reaction solution was dried by a conventional method to obtain a copolymer E-27. The efficiency of the tin coupling in this copolymer was measured. The result is shown in Table 7.

A rubber composition was obtained by mixing ingredients with the copolymer obtained above in accordance with the formulation shown in Table 8 by the same procedures as those conducted in Example 1. The Mooney viscosity ($ML_{1+4}$) of the obtained composition was measured and found to be 64. The obtained rubber composition was vulcanized at 145° C. for 30 minutes, and the physical properties of the resultant vulcanizate were measured. The results are shown in Table 7.

Comparative Example 1

After a 800 ml pressure resistant glass bottle was sufficiently purged with nitrogen, 258 g (39 g of butadiene) of a 15.1% cyclohexane solution of 1,3-butadiene and 42.7 g (10 g of styrene) of a 23.4% cyclohexane solution of styrene were placed into the bottle under nitrogen. To the obtained solution, THF in an amount of 50 eq based on n-BuLi was added as the randomizer. To the thus obtained monomer mixture, 0.266 ml (0.425 mmol) (0.85 mmol/100 g monomer) of a 1.6 N n-hexane solution of n-BuLi was added as the initiator. The obtained mixture was allowed to polymerize in a rotary polymerization bath at 50° C. for 2 hours. A sample of the resultant reaction solution was taken, and the molecular structure of the obtained copolymer was measured by the same methods as those used in Example 1. The results are shown in Table 1. Then, after adding 6.6 g of a 15.1% cyclohexane solution of 1,3-butadiene, 0.26 ml of a 1 N cyclohexane solution of tin tetrachloride was added to the resultant solution as the coupling agent, and the coupling reaction was allowed to proceed at 50° C. for 30 minutes. Then, the same procedures as those conducted in Example 1 were conducted to obtain copolymer C-1. The efficiency of the tin coupling in this copolymer and the physical properties of a vulcanizate obtained by using the copolymer were measured by the same methods as those used in Example 1. The results are shown in Table 1.

Comparative Example 2

After a 800 ml pressure resistant glass bottle was sufficiently purged with nitrogen, 185 g (28 g of butadiene) of a 15.1% cyclohexane solution of 1,3-butadiene and 94 g (22 g of styrene) of a 23.4% cyclohexane solution of styrene were placed into the bottle under nitrogen. To the obtained solution, 0.43 ml (0.021 mmol, K/Li=0.05 eq) of a 0.05 N cyclohexane solution of potassium t-amylate as the potassium compound and 0.21 ml (ether compound/Li=0.5 eq) of a 1 N (oxygen normality) cyclohexane solution of THF as the ether compound were added. To the thus obtained monomer mixture, 0.266 ml (0.425 mmol) (0.85 mmol/100 g monomer) of a 1.6 N n-hexane solution of n-BuLi was added as the initiator. The obtained mixture was allowed to polymerize in a rotary polymerization bath at 50° C. for 2 hours. A sample of the resultant reaction solution was taken, and the molecular structure of the obtained copolymer was measured by the same methods as those used in Example 1. The results are shown in Table 3. Then, the coupling reaction of the copolymer was allowed to proceed in accordance with the same procedures as those conducted in Example 1 to obtain copolymer C-2. The efficiency of the tin coupling in this copolymer and the physical properties of a vulcanizate obtained by using the copolymer were measured by the same methods as those used in Example 1. The results are shown in Table 3.

Comparative Example 3

After a 800 ml pressure resistant glass bottle was sufficiently purged with nitrogen, 232 g (35 g of butadiene) of a 15.1% cyclohexane solution of 1,3-butadiene and 64 g (15 g of styrene) of a 23.4% cyclohexane solution of styrene were placed into the bottle under nitrogen. To the obtained solution, 0.43 ml (0.021 mmol, K/Li=0.05 eq) of a 0.05 N cyclohexane solution of potassium t-amylate as the potassium compound and 0.23 ml (ether compound/Li=1 eq) of a 1 N (oxygen normality) cyclohexane solution of THF as the ether compound were added. To the thus obtained monomer mixture, 0.266 ml (0.425 mmol) (0.85 mmol/100 g monomer) of a 1.6 N n-hexane solution of n-BuLi was added as the initiator. The obtained mixture was allowed to polymerize in a rotary polymerization bath at 50° C. for 2 hours. A sample of the resultant reaction solution was taken, and the molecular structure of the obtained copolymer was measured by the same methods as those used in Example 1. The results are shown in Table 4. Then, the coupling reaction of the copolymer was allowed to proceed in accordance with the same procedures as those conducted in Example 1 to obtain copolymer C-3. The efficiency of the tin coupling in this copolymer and the physical properties of a vulcanizate obtained by using the copolymer were measured by the same methods as those used in Example 1. The results are shown in Table 4.

Comparative Example 4

The same procedures as those conducted in Comparative Example 3 were conducted except that 2.3 ml (ether compound/Li=10 eq) of a 1 N (oxygen normality) cyclohexane solution of THF was used as the ether compound, and copolymer C-4 was obtained. The molecular structure of the obtained copolymer before the coupling and the physical properties of a vulcanizate obtained by using copolymer C-4 after the coupling were measured by the same methods as those used in Example 1. The results are shown in Table 4.

Comparative Example 5

Copolymer C-5 was obtained by a process of multi-step feeding of monomers in accordance with the process described in Example 3 of the specification of Japanese Patent Application Laid-Open No. Showa 60(1985)-23409. The molecular structure of the obtained copolymer before the coupling and the physical properties of a vulcanizate obtained by using copolymer C-5 after the coupling were measured by the same methods as those used in Example 1. The results are shown in Table 4.

Comparative Example 6

A random copolymer (SBR) was synthesized by a semi-batch process as follows. Into a 5 liter reactor which had been charged with 200 ml of cyclohexane, 5.0 mmol of n-BuLi in a n-hexane solution and 10.0 mmol (THF/Li=2 eq) of THF in a cyclohexane solution were added. After the temperature of the resultant solution was adjusted to 70° C., 3125 g of a cyclohexane solution containing 200 g of styrene and 300 g of 1,3-butadiene was added during 3 hours. When the conversion of the monomers reached 98% or more, tin tetrachloride in an amount of 0.6 equivalent based on Li was added, and the coupling reaction was allowed to proceed for 15 minutes to obtain copolymer C-6. The molecular structure of the obtained copolymer before the coupling and the physical properties of a vulcanizate obtained by using copolymer C-6 after the coupling were measured by the same methods as those used in Example 1. The results are shown in Table 4.

Comparative Example 7

After a 800 ml pressure resistant glass bottle was sufficiently purged with nitrogen, 199 g (30 g of butadiene) of a 15.1% cyclohexane solution of 1,3butadiene and 85.5 g (20 g of styrene) of a 23.4% cyclohexane solution of styrene were placed into the bottle under nitrogen. To the obtained solution, 0.43 ml (0.021 mmol, K/Li=0.05 eq) of a 0.05 N cyclohexane solution of potassium t-amylate as the potassium compound were added. To the thus obtained monomer mixture, 0.266 ml (0.425 mmol) (0.85 mmol/100 g monomer) of a 1.6 N n-hexane solution of n-BuLi was added as the initiator. The obtained mixture was allowed to polymerize in a rotary polymerization bath at 50° C. for 2 hours. A sample of the resultant reaction solution was taken, and the molecular structure of the obtained copolymer was measured. The results are shown in Table 4. The coupling reaction of the copolymer was allowed to proceed in accordance with the same procedures as those conducted in Example 1 to obtain copolymer C-7. The efficiency of the coupling in the copolymer and the physical properties of a vulcanizate obtained by using the copolymer were measured by the same methods as those used in Example 1. The results are shown in Table 4.

Comparative Examples 9 to 12

The same procedures as those conducted in Example 1 were conducted except that copolymers C-1 and E-17 obtained in Comparative Example 1 and Example 17, respectively, were used, NR and SBR were blended in ratios shown in Table 6, and rubber compositions were prepared in accordance with the formulation shown in Table 9. The physical properties of vulcanizates obtained from the rubber compositions were measured also by the same methods as those used in Example 1. The results are shown in Table 6.

Comparative Example 13

The same procedures as those conducted in Example 1 were conducted except that copolymer C-1 obtained in Comparative Example 1 was used, NR and SBR were blended in a ratio shown in Table 7, carbon black and silica were used in the amounts shown in Table 7, and a rubber composition was prepared in accordance with the formulation shown in Table 10. The physical properties of a vulcanizate obtained from the rubber composition were measured. The results are shown in Table 7.

Comparative Example 14

The same procedures as those conducted in Example 1 were conducted except that copolymer C-1 obtained in Comparative Example 1 was used, NR and SBR were blended in a ratio shown in Table 7, silica was used in the amount shown in Table 7, and a rubber composition was prepared in accordance with the formulation shown in Table 11. The physical properties of a vulcanizate obtained from the rubber composition were measured. The results are shown in Table 7.

Comparative Example 15

The same procedures as those conducted in Example 27 were conducted except that 3.75 ml of a 1 N cyclohexane solution of lithium hexamethyleneimide was used in place of n-BuLi, and copolymer C-9 was obtained. The molecular structures before and after the coupling were measured by the same methods as those used in Example 1. The results are shown in Table 7. A rubber composition was prepared by using copolymer C-9 after the coupling in accordance with the same procedures as those conducted in Example 1. The Mooney viscosity of the obtained rubber composition was measured and found to be 75. The physical properties of a vulcanizate obtained from the rubber composition were measured. The results are shown in Table 7.

FIG. 1 shows a chart exhibiting the relation between the content of styrene sequences having 4 to 20 styrene units in a copolymer and the abrasion resistance of the copolymer by using the data in Examples 1 to 16 and Comparative Examples 1 to 7. FIG. 2 shows a chart exhibiting the relation between the content of styrene sequences having 4 to 20 styrene units in a copolymer and the hysteresis loss characteristic (tan δ) of the copolymer by using the data of Examples 1 to 16 and Comparative Examples 1 to 7. As shown in FIGS. 1 and 2, when a copolymer has the content of styrene sequences having 4 to 20 styrene units in the range of 40 to 65% by weight as claimed in the present invention, the copolymer shows excellent abrasion resistance and excellent low hysteresis loss characteristic simultaneously.

TABLE 1

|  | Comparative Example | Example | | | | | |
|---|---|---|---|---|---|---|---|
|  | 1 | 1 | 2 | 3 | 4 | 5 | 6 |
| copolymer (SBR) No. | C-1 | E-1 | E-2 | E-3 | E-4 | E-5 | E-6 |
| polymerization condition | | | | | | | |
| styrene in monomers (%) | 20 | 37.5 | 37.5 | 37.5 | 37.5 | 37.5 | 37.5 |
| potassium compound | 0 | KTA | KTA | KTA | KTA | DBSK | KNP |
| K/Li (eq) | 0 | 0.05 | 0.05 | 0.05 | 0.05 | 0.05 | 0.05 |
| ether | THF | DEE | oops | THF | THF | THF | THF |
| ether/Li (eq) | 50 | 0.1 | 0.05 | 1 | 2 | 1 | 1 |
| coupling agent | TTC | TTC | TTC | TTC | TTC | TTC | TTC |
| molecular structure of copolymer | | | | | | | |
| total styrene content (% by wt.) | 20 | 38 | 38 | 38 | 38 | 38 | 38 |
| 4–20 St content (% by wt.) | 16 | 58 | 60 | 53 | 51 | 52 | 51 |
| 20< St content (% by wt.) | 2 | 3 | 2 | 4 | 1 | 2 | 3 |
| vinyl unit content (%) | 57 | 25 | 20 | 20 | 23 | 20 | 20 |
| value of styrene + ½ vinyl units (%) | 48.5 | 50.5 | 48 | 48 | 49.5 | 48 | 48 |
| molecular wt. (Mw) (×10$^4$) | 23 | 22.8 | 23.1 | 24.3 | 24 | 23.4 | 22.8 |
| Mw/Mn | 1.05 | 1.13 | 1.08 | 1.11 | 1.11 | 1.05 | 1.06 |
| efficiency of tin coupling (%) | 67 | 75 | 85 | 69 | 65 | 71 | 70 |
| physical properties of vulcanizate | | | | | | | |
| tensile strength (kg/cm$^2$) | 224 | 250 | 254 | 259 | 243 | 244 | 146 |
| elongation (%) | 450 | 461 | 466 | 473 | 466 | 470 | 471 |
| 300% modulus (kg/cm$^2$) | 133 | 142 | 141 | 142 | 135 | 133 | 132 |
| hardness (°) | 61 | 64 | 63 | 63 | 62 | 63 | 62 |
| abrasion resistance, index (60% slipping ratio) | 100 | 140 | 146 | 138 | 135 | 132 | 130 |
| wet skid resistance, index | 100 | 103 | 102 | 101 | 103 | 102 | 101 |
| tan δ (3% strain) | 0.123 | 0.128 | 0.116 | 0.127 | 0.124 | 0.123 | 0.120 |

4–20 St content: content of styrene sequences having 4 to 20 styrene units
20< St content: content of styrene sequences having more than 20 styrene units
potassium compound: KTA: potassium t-amylate DBSK: potassium dodecylbenzenesulfonate KNP: potassium nonylphenolate
ether compound: THF: tetrahydrofuran DEE: diethoxyethane oops: ditetrahydrofurylpropane
coupling agent: TTC: tin tetrachloride

TABLE 2

|  | Comparative Example | Example | | | | | |
| --- | --- | --- | --- | --- | --- | --- | --- |
|  | 1 | 7 | 8 | 9 | 10 | 11 | 12 |
| copolymer (SBR) No. | C-1 | E-7 | E-8 | E-9 | E-10 | E-11 | E-12 |
| polymerization condition | | | | | | | |
| styrene in monomers (%) | 20 | 37.5 | 37.5 | 37.5 | 37.5 | 37.5 | 37.5 |
| potassium compound | 0 | DBSK | DBSK | DBSK | DBSK | KTA | KTA |
| K/Li (eq) | 0 | 0.05 | 0.05 | 0.05 | 0.05 | 0.033 | 0.087 |
| ether (E), amine (A) | THF | THF | oops | TMEDA | PMDTA | THF | THF |
| E, A/Li (eq) | 50 | 2 | 0.05 | 0.05 | 0.05 | 1 | 0.5 |
| coupling agent | TTC | TTC | TTC | TTC | TTC | TTC | TTC |
| molecular structure of copolymer | | | | | | | |
| total styrene content (% by wt.) | 20 | 38 | 38 | 38 | 38 | 38 | 38 |
| 4–20 St content (% by wt.) | 16 | 47 | 61 | 62 | 62 | 52 | 48 |
| 20< St content (% by wt.) | 2 | 1 | 2 | 2 | 1 | 2 | 3 |
| vinyl unit content (%) | 57 | 22 | 21 | 20 | 21 | 23 | 26 |
| value of styrene + ½ vinyl units (%) | 48.5 | 49 | 48.5 | 48 | 48.5 | 49.5 | 51 |
| molecular wt. (Mw) (×10⁴) | 23 | 23.4 | 23.7 | 24 | 25.3 | 22.8 | 21.8 |
| Mw/Mn | 1.05 | 1.22 | 1.25 | 1.19 | 1.13 | 1.12 | 1.09 |
| efficiency of tin coupling (%) | 67 | 75 | 76 | 78 | 80 | 74 | 68 |
| physical properties of vulcanizate | | | | | | | |
| tensile strength (kg/cm²) | 224 | 256 | 238 | 260 | 251 | 252 | 255 |
| elongation (%) | 450 | 473 | 450 | 475 | 456 | 445 | 460 |
| 300% modulus (kg/cm²) | 133 | 142 | 138 | 138 | 143 | 135 | 133 |
| hardness (°) | 61 | 62 | 61 | 63 | 64 | 62 | 62 |
| abrasion resistance, index (60% slipping ratio) | 100 | 131 | 142 | 143 | 140 | 134 | 129 |
| wet skid resistance, index | 100 | 105 | 103 | 102 | 101 | 104 | 106 |
| tan δ (3% strain) | 0.123 | 0.125 | 0.126 | 0.124 | 0.123 | 0.124 | 0.122 |

4–20 St content: content of styrene sequences having 4 to 20 styrene units
20< St content: content of styrene sequences having more than 20 styrene units
amine compound: TMEDA: tetramethylethylenediamine PMDTA: pentamethylenediethylenetriamine

TABLE 3

|  | Comparative Example | | Example | | | |
| --- | --- | --- | --- | --- | --- | --- |
|  | 1 | 2 | 13 | 14 | 15 | 16 |
| copolymer (SBR) No. | C-1 | C-2 | E-13 | E-14 | E-15 | E-16 |
| polymerization condition | | | | | | |
| styrene in monomers (%) | 20 | 44 | 40 | 38 | 35 | 33 |
| potassium compound | 0 | KTA | KTA | KTA | KTA | KTA |
| K/Li (eq) | 0 | 0.05 | 0.05 | 0.05 | 0.05 | 0.05 |
| ether | THF | THF | THF | THF | THF | THF |
| ether/Li (eq) | 50 | 0.5 | 0.5 | 0.5 | 1 | 2 |
| coupling agent | TTC | TTC | TTC | TTC | TTC | TTC |
| molecular structure of copolymer | | | | | | |
| total styrene content (% by wt.) | 20 | 44 | 40 | 39 | 35 | 33 |
| 4–20 St content (% by wt.) | 16 | 71 | 63 | 56 | 49 | 45 |
| 20< St content (% by wt.) | 2 | 4 | 3 | 3 | 2 | 1 |
| vinyl unit content (%) | 57 | 20 | 20 | 22 | 23 | 26 |
| value of styrene + ½ vinyl units (%) | 48.5 | 54 | 52 | 50 | 46.5 | 46 |
| molecular wt. (Mw) (×10⁴) | 23 | 22.4 | 22.8 | 22.8 | 23.5 | 24.6 |
| Mw/Mn | 1.05 | 1.07 | 1.11 | 1.11 | 1.12 | 1.09 |
| efficiency of tin coupling (%) | 67 | 65 | 64 | 65 | 68 | 70 |
| physical properties of vulcanizate | | | | | | |
| tensile strength (kg/cm²) | 224 | 256 | 261 | 255 | 241 | 244 |
| elongation (%) | 450 | 435 | 435 | 430 | 425 | 431 |
| 300% modulus (kg/cm²) | 133 | 156 | 135 | 132 | 130 | 132 |
| hardness (°) | 61 | 64 | 63 | 62 | 62 | 62 |

TABLE 3-continued

|  | Comparative Example | | Example | | | |
|---|---|---|---|---|---|---|
|  | 1 | 2 | 13 | 14 | 15 | 16 |
| abrasion resistance, index (60% slipping ratio) | 100 | 148 | 142 | 143 | 138 | 128 |
| wet skid resistance, index | 100 | 110 | 108 | 106 | 102 | 96 |
| tan δ (3% strain) | 0.123 | 0.146 | 0.135 | 0.126 | 0.126 | 0.125 |

4–20 St content: content of styrene sequences having 4 to 20 styrene units
20< St content: content of styrene sequences having more than 20 styrene units

TABLE 4

|  | Comparative Example | | | | |
|---|---|---|---|---|---|
|  | 3 | 4 | 5 | 6 | 7 |
| copolymer (SBR) No. | C-3 | C-4 | C-5 | C-6 | C-7 |
| polymerization condition | | | | | |
| styrene in monomers (%) | 30 | 30 | 40 | 40 | 40 |
| potassium compound | KTA | KTA | 0 | 0 | KTA |
| K/Li (eq) | 0.05 | 0.05 | 0 | 0 | 0.05 |
| ether | THF | THF | 0 | THF | 0 |
| ether/Li (eq) | 1 | 10 | 0 | 2 | 0 |
| coupling agent | TTC | TTC | TTC | TTC | TTC |
| molecular structure of copolymer | | | | | |
| total styrene content (% by wt.) | 31 | 30 | 40 | 40 | 40 |
| 4–20 St content (% by wt.) | 38 | 25 | 78 | 6 | 72 |
| 20< St content (% by wt.) | 3 | 1 | 7 | 2 | 5 |
| vinyl unit content (%) | 23 | 35 | 22 | 23 | 18 |
| value of styrene + ½ vinyl units (%) | 42.5 | 47.5 | 51 | 51.5 | 49 |
| molecular wt. (Mw) (×10⁴) | 22.9 | 23 | 23.6 | 22.8 | 21.9 |
| Mw/Mn | 1.15 | 1.06 | 1.21 | 1.23 | 1.12 |
| efficiency of tin coupling (%) | 71 | 65 | 66 | 63 | 65 |
| physical properties of vulcanizate | | | | | |
| tensile strength (kg/cm²) | 225 | 220 | 260 | 241 | 256 |
| elongation (%) | 418 | 421 | 458 | 452 | 463 |
| 300% modulus (kg/cm²) | 151 | 150 | 146 | 135 | 136 |
| hardness (°) | 63 | 61 | 64 | 61 | 62 |
| abrasion resistance, index (60% slipping ratio) | 112 | 105 | 149 | 115 | 149 |
| wet skid resistance, index | 89 | 98 | 105 | 101 | 98 |
| tan δ (3% strain) | 0.122 | 0.124 | 0.145 | 0.126 | 0.137 |

4–20 St content: content of styrene sequences having 4 to 20 styrene units
20< St content: content of styrene sequences having more than 20 styrene units
Comparative Example 5: a multi-step polymerization in which the monomers were divided into portions and fed successively in separate steps.
Comparative Example 6: polymerization in which the monomers were fed in a semi-batch process.

TABLE 5-1

|  | Comparative Example | | Example | |
|---|---|---|---|---|
|  | 1 | 8 | 17 | 18 |
| copolymer (SBR) No. | C-1 | C-8 | E-17 | E-18 |

TABLE 5-1-continued

|  | Comparative Example | | Example | |
|---|---|---|---|---|
|  | 1 | 8 | 17 | 18 |
| polymerization condition | | | | |
| styrene in monomers (%) | 20 | 37.5 | 37.5 | 37.5 |
| potassium compound | 0 | KTA | KTA | KTA |
| K/Li (eq) | 0 | 0.05 | 0.05 | 0.05 |
| ether | THF | DIGLIM | DIGLIM | DIGLIM |
| ether/Li (eq) | 50 | 0.067 | 0.067 | 0.067 |
| coupling agent | TTC | * | TTC | DBTDC |
| molecular structure of copolymer | | | | |
| total styrene content (% by wt.) | 20 | 38 | 38 | 38 |
| 4–20 St content (% by wt.) | 16 | 59 | 59 | 59 |
| 20< St content (% by wt.) | 2 | 3 | 2 | 2 |
| vinyl unit content (%) | 57 | 24 | 24 | 24 |
| value of styrene + ½ vinyl units (%) | 48.5 | 50 | 50 | 50 |
| molecular wt. (Mw) (×10⁴) | 23 | 23.4 | 23.4 | 23.4 |
| Mw/Mn | 1.05 | 1.11 | 1.11 | 1.11 |
| efficiency of tin coupling (%) | 67 | — | 65 | 71 |
| physical properties of vulcanizate | | | | |
| tensile strength (kg/cm²) | 224 | 245 | 265 | 264 |
| elongation (%) | 450 | 530 | 480 | 478 |
| 300% modulus (kg/cm²) | 133 | 123 | 142 | 144 |
| hardness (°) | 61 | 63 | 62 | 61 |
| abrasion resistance, index (60% slipping ratio) | 100 | 125 | 143 | 146 |
| wet skid resistance, index | 100 | 102 | 103 | 102 |
| tan δ (3% strain) | 0.123 | 0.178 | 0.127 | 0. 115 |

TABLE 5-2

|  | Example | | | |
|---|---|---|---|---|
|  | 19 | 20 | 21 | 22 |
| copolymer (SBR) No. | E-19 | E-20 | E-21 | E-22 |
| polymerization condition | | | | |
| styrene in monomers (%) | 37.5 | 37.5 | 37.5 | 37.5 |

TABLE 5-2-continued

| | Example | | | |
|---|---|---|---|---|
| | 19 | 20 | 21 | 22 |
| potassium compound | KTA | KTA | KTA | KTA |
| K/Li (eq) | 0.05 | 0.05 | 0.05 | 0.05 |
| ether | DIGLIM | DIGLIM | DIGLIM | DIGLIM |
| ether/Li (eq) | 0.067 | 0.067 | 0.067 | 0.067 |
| coupling agent or modifier | DOTDC | TBTC | DMI | DMAB |
| molecular structure of copolymer | | | | |
| total styrene content (% by wt.) | 38 | 38 | 38 | 38 |
| 4–20 St content (% by wt.) | 59 | 59 | 59 | 59 |
| 20< St content (% by wt.) | 1 | 2 | 2 | 3 |
| vinyl unit content (%) | 24 | 24 | 24 | 24 |
| value of styrene + ½ vinyl units (%) | 50 | 50 | 50 | 50 |
| molecular wt. (Mw) (×10⁴) | 23.4 | 23.4 | 23.4 | 23.4 |
| Mw/Mn | 1.11 | 1.11 | 1.11 | 1.11 |
| efficiency of tin coupling (%) | 68 | — | — | — |
| physical properties of vulcanizate | | | | |
| tensile strength (kg/cm²) | 263 | 264 | 267 | 271 |
| elongation (%) | 501 | 499 | 481 | 477 |
| 300% modulus (kg/cm²) | 139 | 141 | 145 | 142 |
| hardness (°) | 61 | 60 | 61 | 62 |
| abrasion resistance, index (60% slipping ratio) | 147 | 135 | 138 | 135 |
| wet skid resistance, index | 102 | 100 | 101 | 102 |
| tan δ (3% strain) | 0.116 | 0.110 | 0.126 | 0.128 |

4–20 St content: content of styrene sequences having 4 to 20 styrene units
20< St content: content of styrene sequences having more than 20 styrene units
ether compound: DIGLIM: diethylene glycol dimethyl ether
coupling agent: DBTDC: dibutyltin dichloride DOTDC: dioctyltin dichloride
modifier: TBTC: tributyltin chloride DMI: dimethylimidazolidinone
DMAB: p-N,N'-dimethylaminobenzophenone
*polymerization terminated with isopropyl alcohol

TABLE 6

| Example | | 23 | | 24 | | |
|---|---|---|---|---|---|---|
| Comparative Example | 9 | | 10 | | 11 | 12 |
| copolymer (SBR) No. | C-1 | E-17 | C-1 | E-17 | C-1 | E-17 |
| polymerization condition | | | | | | |
| styrene in monomers (%) | 20 | 37.5 | 20 | 37.5 | 20 | 37.5 |
| potassium compound | 0 | KTA | 0 | KTA | 0 | KTA |
| K/Li (eq) | 0 | 0.05 | 0 | 0.05 | 0 | 0.05 |
| ether | THF | DIGLIM | THF | DIGLIM | THF | DIGLIM |
| ether/Li (eq) | 50 | 0.067 | 50 | 0.067 | 50 | 0.067 |
| coupling agent | TTC | TTC | TTC | TTC | TTC | TTC |
| NR/SBR ratio | 30/70 | 30/70 | 30/70 | 70/30 | 90/10 | 90/10 |
| molecular structure of copolymer | | | | | | |
| total styrene content (% by wt.) | 20 | 38 | 20 | 38 | 20 | 38 |
| 4–20 St content (% by wt.) | 16 | 59 | 16 | 59 | 16 | 59 |
| 20< St content (% by wt.) | 2 | 2 | 2 | 2 | 2 | 2 |
| vinyl unit content (%) | 57 | 24 | 57 | 24 | 57 | 24 |
| value of styrene + ½ vinyl units (%) | 48.5 | 50 | 48.5 | 50 | 48.5 | 50 |
| molecular wt. (Mw) (×10⁴) | 23 | 23.4 | 23 | 23.4 | 23 | 231.4 |
| Mw/Mn | 1.05 | 1.11 | 1.05 | 1.11 | 1.05 | 1.11 |
| efficiency of tin coupling (%) | 67 | 65 | 67 | 65 | 67 | 65 |
| physical properties of vulcanizate | | | | | | |
| tensile strength (kg/cm²) | 215 | 233 | 242 | 262 | 245 | 241 |
| elongation (%) | 473 | 445 | 473 | 473 | 243 | 246 |
| 300% modulus (kg/cm²) | 114 | 136 | 129 | 134 | 134 | 133 |
| hardness (°) | 60 | 63 | 61 | 62 | 61 | 61 |
| abrasion resistance, index (60% slipping ratio) | 100 | 139 | 110 | 129 | 118 | 116 |
| wet skid resistance, index | 100 | 102 | 93 | 95 | 91 | 91 |
| tan δ (3% strain) | 0.133 | 0.136 | 0.152 | 0.157 | 0.148 | 0.148 |

4–20 St content: content of styrene sequences having 4 to 20 styrene units
20< St content: content of styrene sequences having more than 20 styrene units

TABLE 7

| Example | | 25 | | 26 | | 27 |
|---|---|---|---|---|---|---|
| Comparative Example | 13 | | 14 | | 15 | |
| copolymer (SBR) No. | C-1 | E-17 | C-1 | E-17 | C-9 | E-23 |
| polymerization condition | | | | | | |
| styrene in monomers (%) | 20 | 37.5 | 20 | 37.5 | 37.5 | 37.5 |
| potassium compound | 0 | KTA | 0 | KTA | KTA | KTA |
| K/Li (eq) | 0 | 0.05 | 0 | 0.05 | 0.05 | 0.05 |
| ether | THF | DIGLIM | THF | DIGLIM | DIGLIM | DIGLIM |
| ether/Li (eq) | 50 | 0.067 | 50 | 0.067 | 50 | 0.067 |
| coupling agent | TTC | TTC | TTC | TTC | TTC | TTC |
| NR/SBR ratio | 30/70 | 30/70 | 30/70 | 30/70 | 0/100 | 0/100 |
| carbon black N339 (% by wt.) | 25 | 25 | 0 | 0 | 50 | 50 |
| silica (% by wt.) | 25 | 25 | 50 | 50 | 0 | 0 |
| molecular structure of copolymer | | | | | | |
| total styrene content (% by wt.) | 20 | 38 | 20 | 38 | 38 | 38 |
| 4–20 St content (% by wt.) | 16 | 59 | 16 | 59 | 59 | 61 |
| 20< St content (% by wt.) | 2 | 2 | 2 | 2 | 2 | 3 |
| vinyl unit content (%) | 57 | 24 | 57 | 24 | 22 | 21 |
| value of styrene + ½ vinyl units (%) | 48.5 | 50 | 48.5 | 50 | 49 | 48.5 |
| molecular wt. (Mw) (×$10^4$) | 23 | 23.4 | 23 | 23.4 | 22.1 | 22.5 |
| Mw/Mn | 1.05 | 1.11 | 1.05 | 1.11 | 1.13 | 1.09 |
| efficiency of tin coupling (%) | 67 | 65 | 67 | 65 | 38 | 68 |
| physical properties of vulcanizate | | | | | | |
| tensile strength (kg/cm$^2$) | 205 | 233 | 187 | 225 | 246 | 253 |
| elongation (%) | 523 | 545 | 450 | 478 | 410 | 460 |
| 300% modulus (kg/cm$^2$) | 102 | 108 | 107 | 112 | 148 | 135 |
| hardness (°) | 59 | 61 | 56 | 59 | 62 | 63 |
| abrasion resistance, index (60% slipping ratio) | 100 | 127 | 100 | 129 | 100 | 110 |
| wet skid resistance, index | 100 | 103 | 100 | 102 | 100 | 102 |
| tan δ (3% strain) | 0.112 | 0.115 | 0.105 | 0.108 | 0.125 | 0.118 |

4–20 St content: content of styrene sequences having 4 to 20 styrene units
20< St content: content of styrene sequences having more than 20 styrene units
Comparative Example 15: polymerization using lithium hexamethyleneimide as the initiator

TABLE 8

| | part by weight |
|---|---|
| master batch | |
| SBR in Example or Comparative Example | 100 |
| carbon black N339 | 50 |
| aromatic oil | 10 |
| stearic acid | 1.5 |
| antioxidant 6C[1] | 1 |
| paraffin wax | 1 |
| final batch | |
| ZnO | 2 |
| vulcanization accelerator DPG[2] | 0.4 |
| vulcanization accelerator DM[3] | 0.5 |
| vulcanization accelerator NS[4] | 0.5 |
| sulfur | 1.3 |

[1] N-(1,3-dimethylbutyl)-N'-phenyl-p-phenylenediamine
[2] diphenylguanidine
[3] dibenzothiazyl sulfide
[4] N-t-butylbenzothiazolylsulfenamide

TABLE 9

| | part by weight |
|---|---|
| master batch | |
| total of NR and SBR in Example or Comparative Example | 100 |
| carbon black N339 | 50 |
| aromatic oil | 10 |
| stearic acid | 1.5 |
| antioxidant 6C | 1 |
| paraffin wax | 1 |
| final batch | |
| ZnO | 2 |
| vulcanization accelerator DPG | 0.2 |
| vulcanization accelerator DM | 0.5 |
| vulcanization accelerator NS | 0.5 |
| sulfur | 1.3 |

TABLE 10

| | part by weight |
|---|---|
| master batch | |
| total of NR and SBR in Example or Comparative Example | 100 |
| silica | 25 |
| carbon black N339 | 25 |
| aromatic oil | 0 |
| stearic acid | 1.5 |
| antioxidant 6C | 1 |
| paraffin wax | 1 |

TABLE 10-continued

|  | part by weight |
| --- | --- |
| Si-69[1] | 2.5 |
| final batch | |
| ZnO | 2 |
| vulcanization accelerator DPG | 0.2 |
| vulcanization accelerator DM | 0.5 |
| vulcanization accelerator NS | 0.5 |
| sulfur | 1.3 |

[1]Si-69: (a trade name, a product of DEGUSSA Company, silane coupling agent), bis(3-triethoxysilylpropyl)-tetrasufide

TABLE 11

|  | part by weight |
| --- | --- |
| master batch | |
| total of NR and SBR in Example or Comparative Example | 100 |
| silica | 50 |
| aromatic oil | 0 |
| stearic acid | 1.5 |
| antioxidant 6C | 1 |
| paraffin wax | 1 |
| Si-69 | 5 |
| final batch | |
| ZnO | 2 |
| vulcanization accelerator DPG | 0.2 |
| vulcanization accelerator DM | 1.0 |
| vulcanization accelerator NS | 1.0 |
| sulfur | 1.5 |

As shown in Tables 1 to 7, the copolymers and the rubber compositions of the present invention show the low hysteresis loss characteristic and the wet skid resistance of excellent levels and remarkably improved fracture characteristics and abrasion resistance.

The copolymers of the present invention having the molecular structure which has the total styrene content, the content of styrene sequences having 4 to 20 styrene units, the content of styrene sequences having more than 20 styrene units, the content of the vinyl unit in the butadiene part, and the value of (styrene+½ vinyl units) in the ranges specified in the present invention and the coupling structure or modified structure specified in the present invention (Examples 1 to 22 and 27), and the rubber compositions of the present invention which are the compositions comprising the copolymer of the present invention and carbon black (Examples 1 to 22 and 27); the composition comprising the copolymer of the present invention, carbon black, and silica, the composition comprising the copolymer of the present invention and silica, and the composition comprising another rubber, the copolymer of the present invention, and carbon black (Examples 23 and 24); the composition comprising another rubber, the copolymer of the present invention, carbon black, and silica (Example 25); and the composition comprising another rubber, the copolymer of the present invention, and silica (Example 26) showed highly balanced properties as shown above.

On the other hand, as clearly shown in the comparative examples 1 to 14, the copolymers in the comparative examples could not exhibit the effect of the present invention because at least one of the elements in the molecular structure which are claimed in the present invention was outside the range claimed in the present invention.

As shown in Comparative Example 15 (refer to Example 27 for comparison), the styrene-butadiene copolymer obtained by using lithium hexamethyleneimide, a cyclic aminolithium compound, as the initiator showed a decreased efficiency of the coupling under the practical condition of the polymerization (i.e., at a high temperature). Therefore, the low hysteresis loss characteristic was insufficient, and the abrasion resistance was poor. Moreover, the processability was inferior as can be understood from the high Mooney viscosity.

Because of the constructions described above, the copolymers and the rubber compositions of the present invention exhibit the advantages that the low hysteresis loss characteristic and the wet skid resistance are held at high levels, and the fracture characteristics and the abrasion resistance are remarkably improved.

What is claimed is:

1. A styrene-butadiene copolymer wherein:

a total styrene content is in the range of 33 to 42% by weight of the styrene-butadiene copolymer;

a content of styrene sequences having 4 to 20 styrene units is in the range of 40 to 65% by weight of the total styrene content, as measured by nuclear magnetic resonance spectroscopy and gel permeation chromatography in combination;

a content of styrene sequences having more than 20 styrene units is in the range of 5% by weight or less of the total styrene content, as measured by gel permeation chromatography;

a content of vinyl unit is in the range of 30% by mol or less of the butadiene part of the styrene-butadiene copolymer;

a sum of the total styrene value and ½ of the content of vinyl units is in the range of 46 to 52%; and wherein the styrene-butadiene copolymer is obtained by copolymerizing styrene and butadiene in a hydrocarbon solvent in the presence of (1) an organolithium initiator selected from the group consisting of methyllithium, ethyllithium, propyllithium, n-butyllithium, sec-butyllithium, t-butyllithium, hexyllithium, octyllithium, tetramethylenedilithium, pentamethylenedilithium, hexamethylenedilithium, phenyllithium, tolyllithium, lithium naphthylide and benzyllithium and dilithium formed by the reaction of diisopropenylbenzene and butyllithium, (2) at least one type of potassium compound selected from the group consisting of potassium alcoholates, potassium sulfonates, and potassium carboxylates, and (3) at least one type of compound selected from the group consisting of ether compounds and amine compounds, and adding a compound selected from the group consisting of tin compounds, isocyanate compounds, imidazolidinone compounds, and aminobenzophenone compounds as a coupling agent or a modifier to the copolymerization product after copolymerization has been completed.

2. A styrene-butadiene copolymer according to claim 1, wherein the inner or end structure of the butadiene-styrene copolymer has tin-carbon bond.

3. A styrene-butadiene copolymer according to claim 1, wherein the styrene-butadiene copolymer has a weight-average molecular weight of $5 \times 10^4$ to $100 \times 10^4$ as measured without the inner or end structure having a bond selected from the group consisting of a tin-carbon bond, a carbon-carbon bond, a carbon-nitrogen bond, and a carbon-oxygen bond.

4. A styrene-butadiene copolymer according to claim 1, wherein the styrene-butadiene copolymer has a molecular weight distribution (Mw/Mn) of 1.0 to 1.3 as measured without the inner or end structure having a bond selected from the group consisting of a tin-carbon bond, a carbon-carbon bond, a carbon-nitrogen bond, and a carbon-oxygen bond.

5. A styrene-butadiene copolymer according to claim 1, wherein the potassium compound is at least one selected from the group consisting of potassium t-amylate, potassium dodecylbenzenesulfonate, and potassium nonylphenolate.

6. A styrene-butadiene copolymer according to claim 1, wherein the ether compounds are at least one selected from the group consisting of dialkoxyalkyl compounds, diethylene glycol dialkyl ether compounds, ethylene glycol dialkyl ether compounds, tetrahydrofuran, and tetrahydrofuran oligomer compounds.

7. A styrene-butadiene copolymer according to claim 1, wherein the amine compounds are at least one selected from the group consisting of diamine compounds and triamine compounds.

8. A styrene-butadiene copolymer according to claim 1, wherein the tin compounds are at least one selected from the group consisting of tin tetrachloride and organotin chlorides.

9. A styrene-butadiene copolymer according to claim 1, wherein the amount of potassium compound is 0.01 to 0.2 mol equivalent per mol of lithium.

10. A styrene-butadiene copolymer according to claim 1, wherein at least one of the ether compound and the amine compound is used in an amount of 0.01 to 2.0 mol equivalent per 1 mol of lithium.

11. A rubber composition comprising (1) 100 parts by weight of a rubber component comprising 20 parts by weight or more of the styrene-butadiene copolymer described in claim 1; (2) 25 to 150 parts by weight of a filler selected from the group consisting of carbon black fillers, silica fillers, and combined fillers of carbon black and silica; and (3) 0 to 50 parts by weight of a process oil.

12. A rubber composition according to claim 11, wherein the rubber composition additionally comprises 3 to 20% by weight of a silane coupling agent based on silica in the silica filler or the combined filler of carbon black and silica.

13. A rubber composition according to claim 11, wherein the rubber component comprises the styrene-butadiene rubber and a diene rubber.

14. A rubber composition according to claim 13, wherein the diene rubber is at least one selected from the group consisting of natural rubber, butadiene rubber, isoprene rubber, and styrene-butadiene rubber.

15. The styrene-butadiene copolymer as claimed in claim 1, wherein said coupling agent or modifier to the copolymerization product is a tin compound.

* * * * *